(12) United States Patent
Cheng et al.

(10) Patent No.: US 10,079,497 B2
(45) Date of Patent: Sep. 18, 2018

(54) CHARGE DEVICE FOR A DRONE

(71) Applicant: Coretronic Intelligent Robotics Corporation, Hsinchu County (TW)

(72) Inventors: Hsu-Chih Cheng, Hsin-Chu (TW); Ying-Chieh Chen, Hsin-Chu (TW); Chi-Tong Hsieh, Hsin-Chu (TW)

(73) Assignee: Coretronic Intelligent Robotics Corporation, Hsinchu County (TW)

( * ) Notice: Subject to any disclaimer, the term of this patent is extended or adjusted under 35 U.S.C. 154(b) by 123 days.

(21) Appl. No.: 15/414,636

(22) Filed: Jan. 25, 2017

(65) Prior Publication Data
US 2018/0212446 A1    Jul. 26, 2018

(51) Int. Cl.
*H02J 7/00* (2006.01)
*B64C 39/02* (2006.01)

(52) U.S. Cl.
CPC .......... *H02J 7/0044* (2013.01); *H02J 7/0052* (2013.01); *B64C 39/024* (2013.01); *B64C 2201/108* (2013.01); *B64C 2201/201* (2013.01)

(58) Field of Classification Search
USPC ........................................ 320/107, 108, 109
See application file for complete search history.

(56) References Cited

U.S. PATENT DOCUMENTS 9,421,869 B1 * 8/2016 Ananthanarayanan ...................... B60L 5/005
9,505,493 B2 * 11/2016 Borko ................... B64C 39/024

| | | | |
|---|---|---|---|
| 2016/0039300 A1* | 2/2016 | Wang | B60L 11/1822 244/39 |
| 2016/0196756 A1 | 7/2016 | Prakash et al. | |
| 2016/0257401 A1* | 9/2016 | Buchmueller | B64C 39/024 |
| 2016/0334785 A1* | 11/2016 | Morrison | A63H 30/04 |
| 2017/0050749 A1* | 2/2017 | Pilskalns | B64F 1/362 |
| 2017/0225801 A1* | 8/2017 | Bennett | B64F 1/222 |
| 2017/0300855 A1* | 10/2017 | Lund | B64C 39/024 |

FOREIGN PATENT DOCUMENTS

| | | |
|---|---|---|
| CN | 204642164 | 9/2015 |
| CN | 205051380 | 2/2016 |
| CN | 105951614 | 9/2016 |

* cited by examiner

*Primary Examiner* — Brian Ngo
(74) *Attorney, Agent, or Firm* — JCIPRNET

(57) ABSTRACT

A charge device for a drone includes a base and a covering mechanism. The base has a charge portion. The covering mechanism includes two covers, two first position-limiting components and two second position-limiting components. The two covers are movably disposed on the base. The covers are adapted to move toward each other to become a closed state and cover the charge portion, and the covers are adapted to move away from each other to become an expanded state and expose the charge portion. The first position-limiting components are connected to the covers respectively. Each of the second position-limiting components is connected between the covers. When the covers are in the closed state, the first position-limiting components and the second position-limiting components are located above the charge portion. When the covers are in the expanded state, the first position-limiting components and the second position-limiting components are away from the charge portion.

20 Claims, 12 Drawing Sheets

CHARGE DEVICE FOR A DRONE

BACKGROUND OF THE INVENTION

Field of the Invention

The invention relates to a charge device, and particularly relates to a charge device for a drone.

Description of Related Art

Along with quick development of technology, development cost of unmanned aerial vehicle (UAV) (which is also referred to as drone) originally applied in military field is also decreased, and various electronic companies actively involve in the UAV market. Regarding applications of goods delivery, foods delivery and sports photography, the electronic companies try to implement the above applications through the UAVs recently. The UAV market is expected to bring a lot of job opportunities, and its economic output is limitless.

On the other hand, some of the UAVs need to be charged at a charge station. The charge station could be a box having a charge area therein and a movable cover for covering the charge area. The charge station may further have a plurality of position-limiting components above the charge area for moving the drone to a predetermined position. Under the above mentioned arrangement, a driving unit has to be installed at the charge station for driving the cover to be opened or closed, and another driving unit has to be installed at the charge station for driving the position-limiting components to make the drone to an appropriate position. However, more than one driving unit may increase manufacturing cost of the charge station. In addition, the operation space of the position-limiting components may be limited by side walls of the box, such that the position-limiting components may not position the drone properly.

The information disclosed in this "Description of Related Art" is only for enhancement of understanding of the background of the described technology and therefore it may contain information that does not form the prior art that is already known to a person of ordinary skill in the art. Further, the information disclosed in the "Description of Related Art" section does not mean that one or more problems to be resolved by one or more embodiments of the invention were acknowledged by a person of ordinary skill in the art.

SUMMARY OF THE INVENTION

The invention is directed to a charge device for a drone, which has a low manufacturing cost, and provides a large operation space for position-limiting components.

Other objects and advantages of the invention can be further illustrated by the technical features broadly embodied and described as follows.

In order to achieve one or a portion of or all of the objects or other objects, an embodiment of the invention provides a charge device for a drone including a base and a covering mechanism. The base has a charge portion. The covering mechanism includes two covers, two first position-limiting components and two second position-limiting components. The two covers are movably disposed on the base. The covers are adapted to move toward each other to become a closed state and cover the charge portion, and the covers are adapted to move away from each other to become an expanded state and expose the charge portion. The first position-limiting components are connected to the covers respectively. Each of the second position-limiting components is connected between the covers.

According to the above descriptions, the embodiments of the invention have at least one of the following advantages or effects. In the charge device of the invention, the first position-limiting components and the second position-limiting components are connected to the covers, such that when the covers are moved between the expanded state and the closed state, the first position-limiting components and the second position-limiting components are driven by the covers to position or release the drone. Accordingly, only one driving unit has to be installed at the charge device for driving the covers, and for driving the first position-limiting components and the second position-limiting components through the covers, so as to save the manufacturing cost. In addition, the first position-limiting components and the second position-limiting components are adapted to move far away from the charge portion along with the covers. That is, a large operation space is provided for the first position-limiting components and the second position-limiting components by the moving range of the covers, such that the first position-limiting components and the second position-limiting components are able to position the drone properly.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
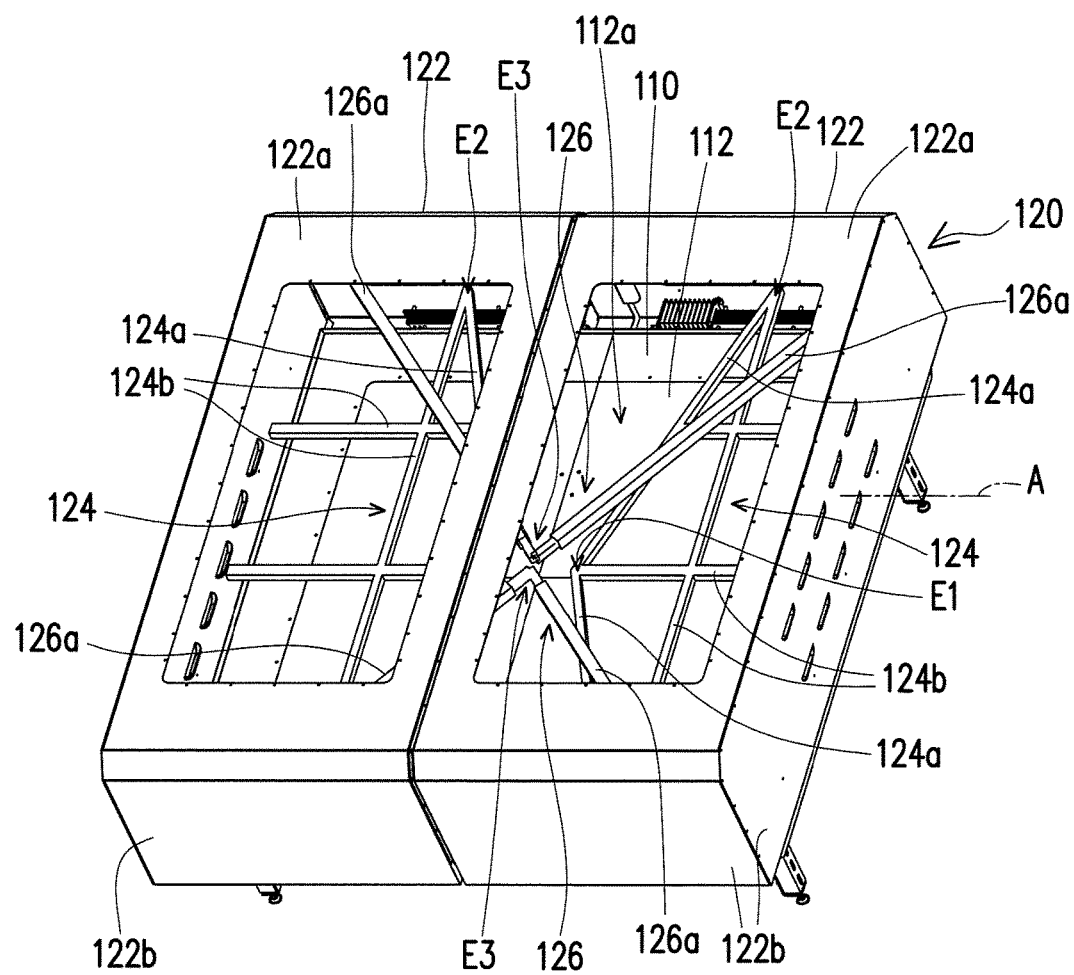
FIG. 1A is a three dimensional view of a charge device according to an embodiment of the invention.
Figure 1B:
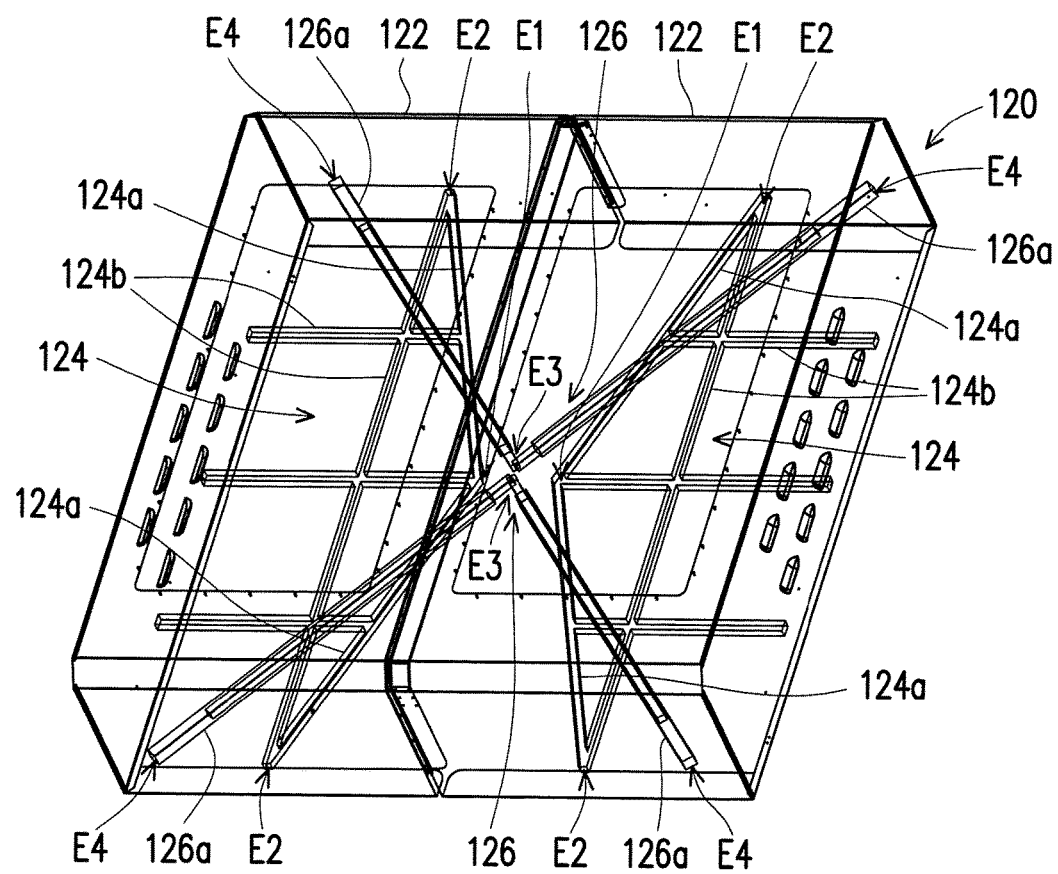
FIG. 1B is a perspective view of a covering mechanism in FIG. 1A.

FIG. 1A is a three dimensional view of a charge device according to an embodiment of the invention. FIG. 1B is a perspective view of a covering mechanism in FIG. 1A. Referring to FIG. 1A and FIG. 1B, the charge device 100 of the embodiment includes a base 110 and a covering mechanism 120. The base 110 has a charge portion 112. The charge portion 112 has a supporting surface 112a adapted to support a drone. The covering mechanism 120 includes two covers 122, two first position-limiting components 124 and two second position-limiting components 126. The two covers 122 are movably disposed on the base 110. For example, the covers 122 are slidably disposed on the base 110 through sliding rails or other suitable sliding assembly (not shown), along a moving axis A parallel to the supporting surface 112a of the charge portion 112. The first position-limiting components 124 may be connected to the covers 122 respectively, and each of the second position-limiting components 126 may be connected between the covers 122.

Figure 2A:
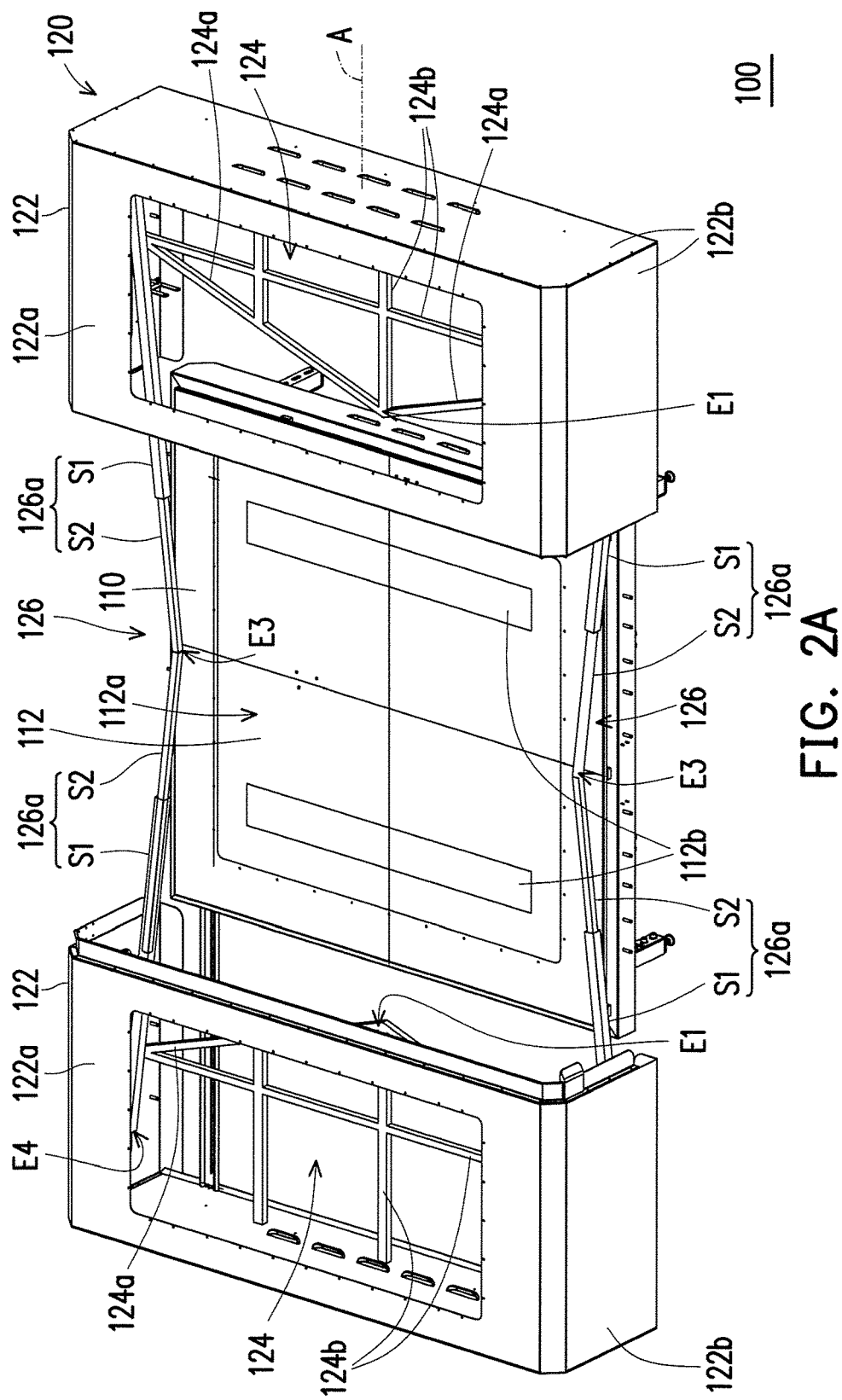
FIG. 2A illustrates the covers in FIG. 1A being expanded.
Figure 2B:
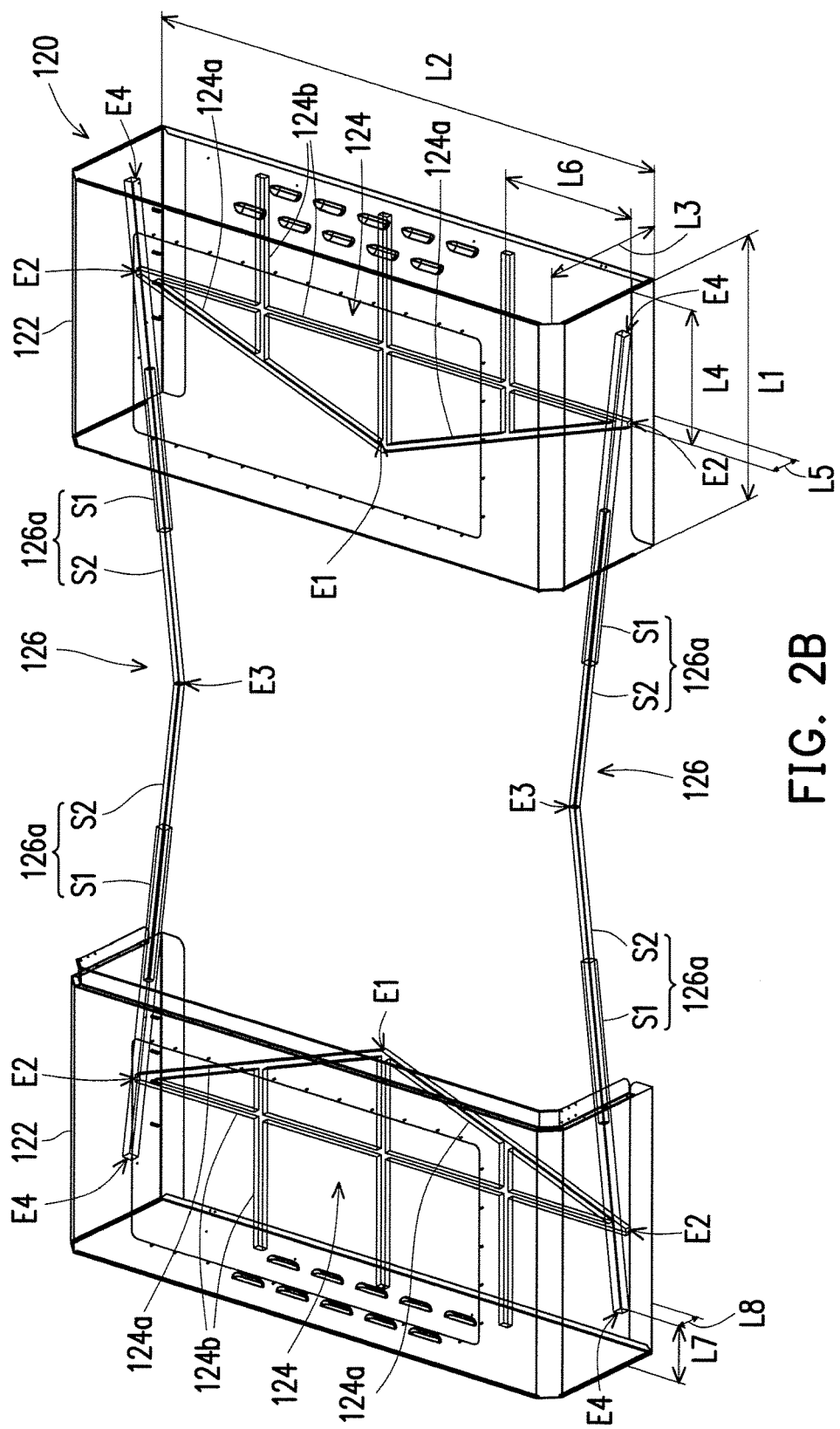
FIG. 2B is a perspective view of the covering mechanism in FIG. 2A.

FIG. 2A illustrates the covers in FIG. 1A being expanded. FIG. 2B is a perspective view of the covering mechanism in FIG. 2A. The covers 122 are adapted to move toward each other to become a closed state and cover the charge portion 112, as FIG. 1A and FIG. 1B showing. In addition, the covers 122 are adapted to move away from each other to become an expanded state (opened state), and the charge portion 112 is exposed, as FIG. 2A and FIG. 2B showing. When the covers 122 are in the closed state shown in FIG. 1A and FIG. 1B, the first position-limiting components 124 and the second position-limiting components 126 are located above the charge portion 112 to position the drone on the charge portion 112. When the covers 122 are in the expanded state shown in FIG. 2A and FIG. 2B, the first position-limiting components 124 and the second position-limiting components 126 are away from the charge portion 112 to release the drone.

Under the above mentioned arrangement, the first position-limiting components 124 and the second position-limiting components 126 are connected to the covers 122, such that when the covers 122 are moved between the expanded state and the closed state, the first position-limiting components 124 and the second position-limiting components 126 are driven by the moving of the covers 122 to position or release the drone. Accordingly, only one driving unit (not shown), for example a motor, has to be installed at the charge device 100 for driving the covers 122, and then the covers 122 may drive the first position-limiting components 124 and the second position-limiting components 126, so as to save the manufacturing cost. In addition, the first position-limiting components 124 and the second position-limiting components 126 are adapted to move far away from the charge portion 112 along with the moving axis A. That is, a large operation space is provided by the moving range of the covers 122, such that the first position-limiting components 124 and the second position-limiting components 126 are able to position the drone properly.

Figure 3:
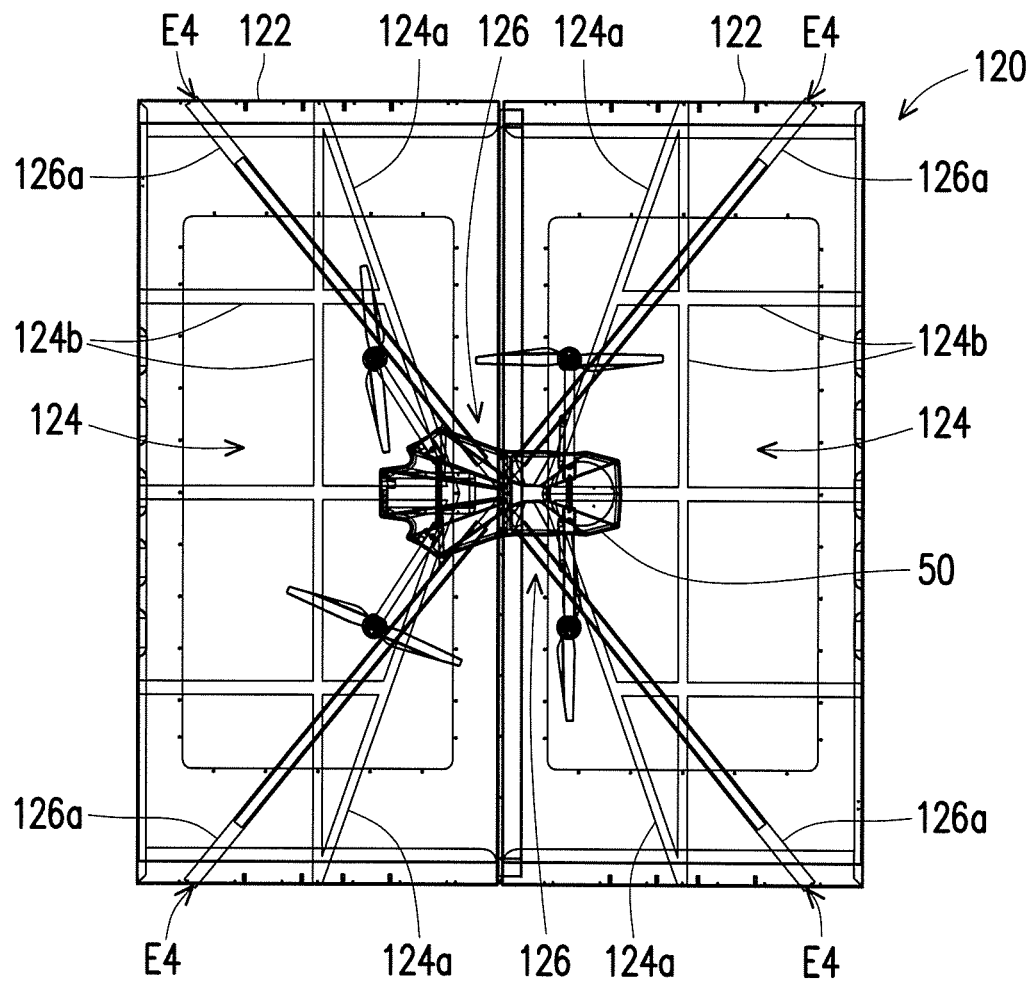
FIG. 3 is a top view of the covering mechanism in FIG. 1B with a drone.
Figure 4:
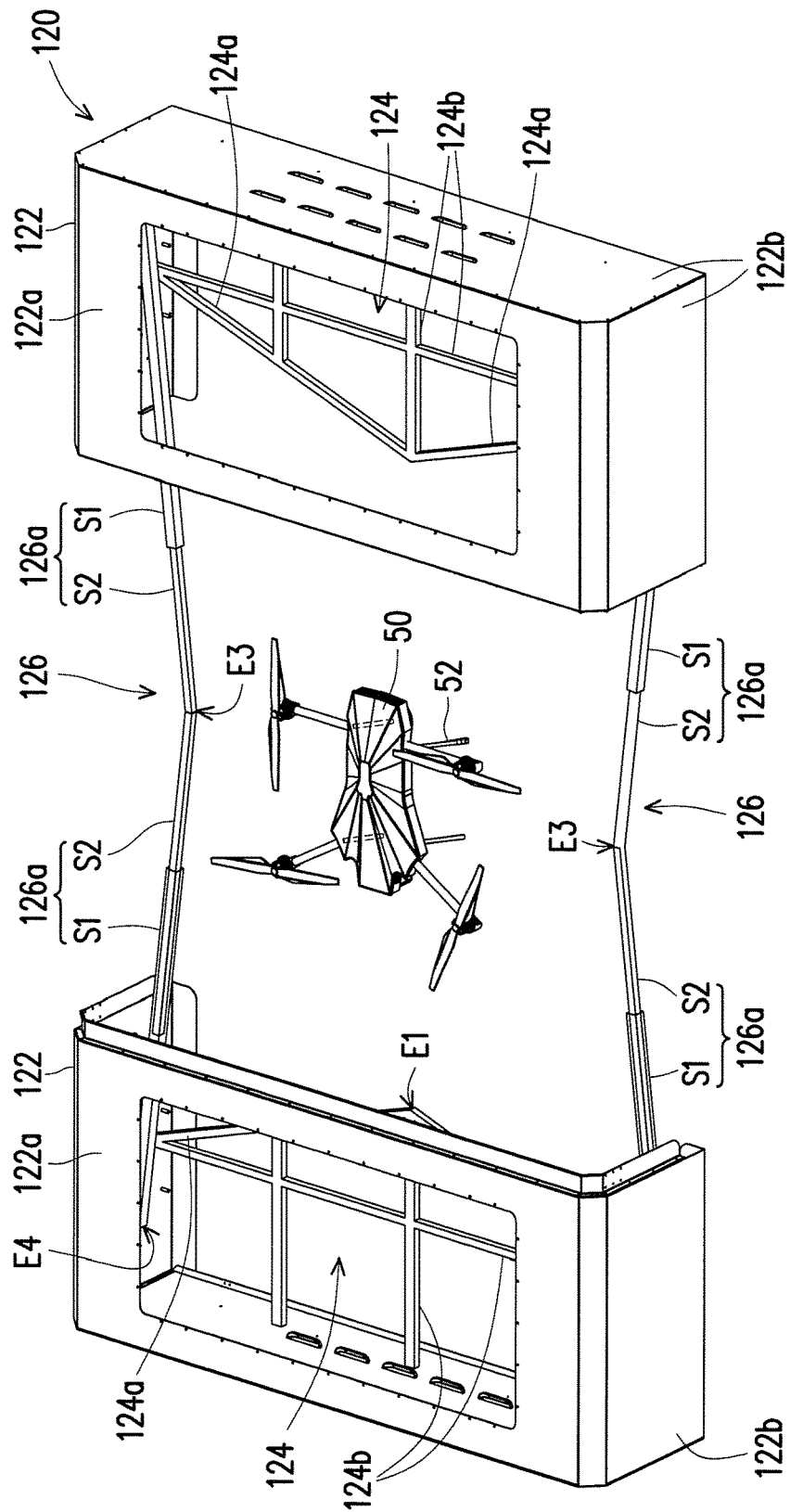
FIG. 4 is a three dimension view of the covering mechanism in FIG. 2A with a drone.

FIG. 3 is a top view of the covering mechanism in FIG. 1B with a drone. FIG. 4 is a three dimension view of the covering mechanism in FIG. 2A with a drone. Specifically, when the covers 122 are in the expanded state as FIG. 4 showing, the drone 50 is adapted to land on the charge portion 112 (shown in FIG. 1A and FIG. 1B) or takeoff from the charge portion 112. When the covers 122 move from the expanded state to the closed state, the first position-limiting components 124 and the second position-limiting components 126 push the drone 50 located on the charge portion 112 to move to a predetermined position in the charge portion 112, as FIG. 3 showing. Further, the drone 50 has a plurality of stands 52 (four stands 52 are shown in FIG. 4) for contacting charging electrodes 112b of the charge portion 112 (shown in FIG. 2A). When the covers 122 move from the expanded state to the closed state, each of the stands 52 is pushed by one of the first position-limiting components 124 and one of the second position-limiting components 126 or both of the first position-limiting components 124 and one of the second position-limiting components 126, so as to move the drone 50 to the predetermined position. The drone 50 may charge the electric power through the contact between the stands 53 of the drone 50 and the charging electrodes 112b of the charge portion 112.

In the embodiment, when the covers 122 are in the closed state, a containing space is formed between the covers 122 and the base 110 and adapted to contain the drone 50. Specifically, each of the covers 122 has an upper wall 122a (labelled in FIG. 1A, FIG. 2A and FIG. 4) and a plurality of side walls 122b (labelled in FIG. 1A, FIG. 2A and FIG. 4) connected to the top wall 122a. When the covers 122 are in the closed state, the upper walls 122a and the side walls 122b surround the charge portion 112a to form the containing space. In addition, each of the first position-limiting components 124 and each of the second position-limiting components 126 are misaligned with each other along the moving axis A of the covers 122. For example, the height of between each of the first position-limiting components 124 and the charge portion 112a and the height of between each of the second position-limiting components 126 and the charge portion 112a are different distance, so as to prevent the first position-limiting components 124 and the second position-limiting components 126 from being interfered with each other in the closed state.

Referring to FIG. 2A and FIG. 2B, in the embodiment, the first position-limiting components 124 are fixed at the covers 122 respectively. Specifically, each of the first position-limiting components 124 includes two first rods 124a. Each of the first rods 124a has a first end E1 and a second end E2 opposite to the first end E1, the second ends E2 connect to the corresponding cover 122. In addition, each of the first position-limiting components 124 further includes a plurality of connecting elements 124b (illustrating as a plurality of rods), and the connecting elements 124b are connected between the first rods 124a and the corresponding cover 122 for enhancing structural strength of the covering mechanism 120. Referring to FIG. 4, the connecting elements 124b use against the gravity of the first rods 124a.

In the embodiment, each of the second position-limiting components 126 is pivoted between the covers 122. Specifically, each of the second position-limiting components 126 includes two second rods 126a. Each of the second rods 126a has a third end E3 and a fourth end E4 opposite to the third ends E3, the third ends E3 of each of the second rods 126a are pivoted to each other, and the fourth ends E4 are pivoted to the covers 122 respectively. Further, each of the second rods 126a includes a first segment S1 and a second segment S2 slidably disposed on each other, the first segments S1 are pivoted to the covers 122 respectively, and the second segments S2 of each of the second rods 126a are pivoted to each other. Along with the moving axis A of the covers 122, the first segment S1 and the second segment S2 are able to slide relatively to each other to change the length of each of the second rods 126a, such that the covering mechanism 120 could be operated successfully.

The two first rods 124a of each of the first position-limiting components 124 of the embodiment form a ">" shaped structure, such that the distance between the two first position-limiting components 124 is increased gradually from each of the first ends E1 to the corresponding second end E2. Similarly, when the covers 122 are in the closed state, the two second rods 126a of each of the second position-limiting components 126 of the embodiment form a ">" shaped structure, such that the distance between the two second position-limiting components 126 is increased gradually from each of the third ends E3 to the corresponding fourth end E4. By this arrangement, when the covers 122 are from the expanded state to the closed state, the first position-limiting components 124 and the second position-limiting components 126 could smoothly guide the drone 50 to move to the predetermined position by the first rods 124a and the second rods 126a contacting the stands 52 of drone 50. As an example, the sizes of the covering mechanism 120 are described below.

Figure 5:
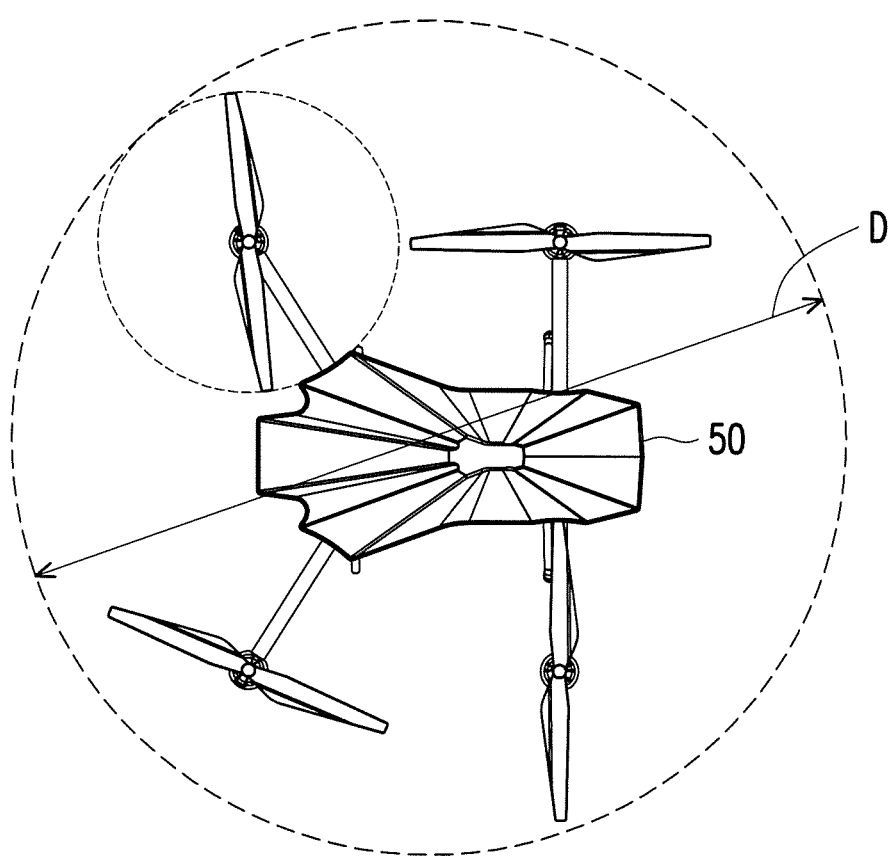
FIG. 5 is a top view of the drone in FIG. 4.

Referring to FIG. 2B, in the embodiment, a width L1 of each of the covers 122 is about 786 mm, a length L2 of each of the covers 122 is about 1694 mm, a height L3 of each of the covers 122 is about 441 mm, a distance L4 between the second end E2 and the a back side of the cover 122 is about 293 mm, a distance L5 between the second end E2 and the a bottom side of the cover 122 is about 116 mm, a distance L6 between a connecting element 124b and a lateral side of the cover 122 is about 386 mm, a distance L7 between the fourth end E4 and a back side of the cover 122 is about 101 mm, and a distance L8 between the fourth end E4 and a lateral side of the cover 122 is about 118 mm. FIG. 5 is a top view of the drone in FIG. 4. Referring to FIG. 5, in the embodiment, a maxima diameter D of the drone 50 is, for example, about 1122 mm, such that the drone 50 is adapted to be contained in the containing space formed between the two covers 122. The invention is not limited thereto.

Figure 6:
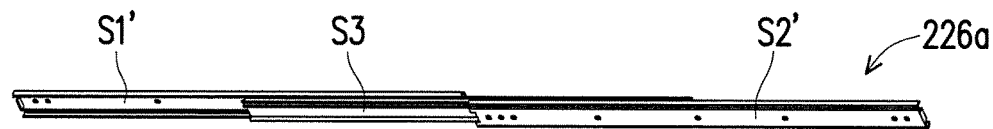
FIG. 6 is a three dimension view of a second rod according to another embodiment of the invention.

In the embodiment, the first segment S1 of each of the second rods 126a may be a sleeve, and the corresponding second segment S2 may be slidably inserted into the sleeve. However, the invention is not limited thereto. FIG. 6 is a three dimension view of a second rod according to another embodiment of the invention. The differences between the second rod 226a in FIG. 6 and the second rod 126a above mentioned are that the first segment S1' and the second segment S2' are sliding rails, and the second rod 226a further includes a third segment S3 slidably connected between the first segment S1' and the second segment S2'. The first segment S1' and the second segment S2' are adapted to slide along the third segment S3, such that the length of the second rod 226a is changeable.

Figure 7:
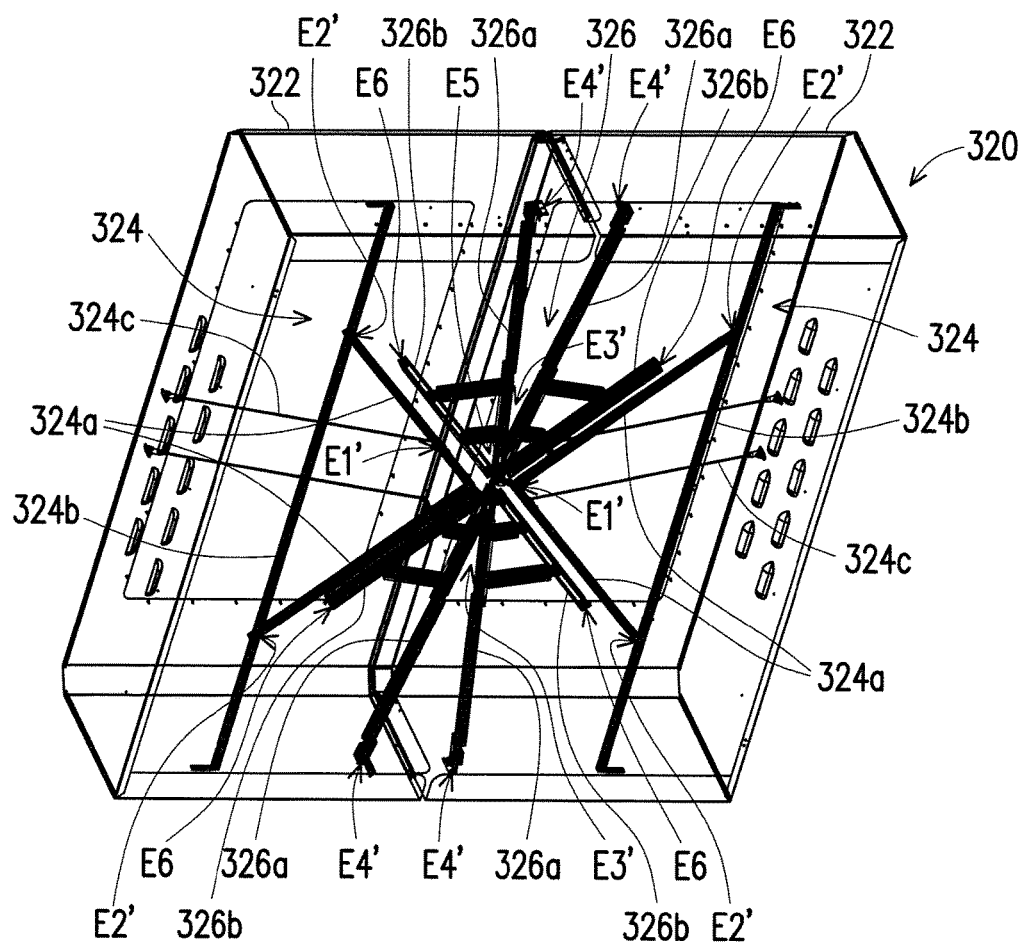
FIG. 7 is a perspective view of a covering mechanism according to another embodiment of the invention.
Figure 8:
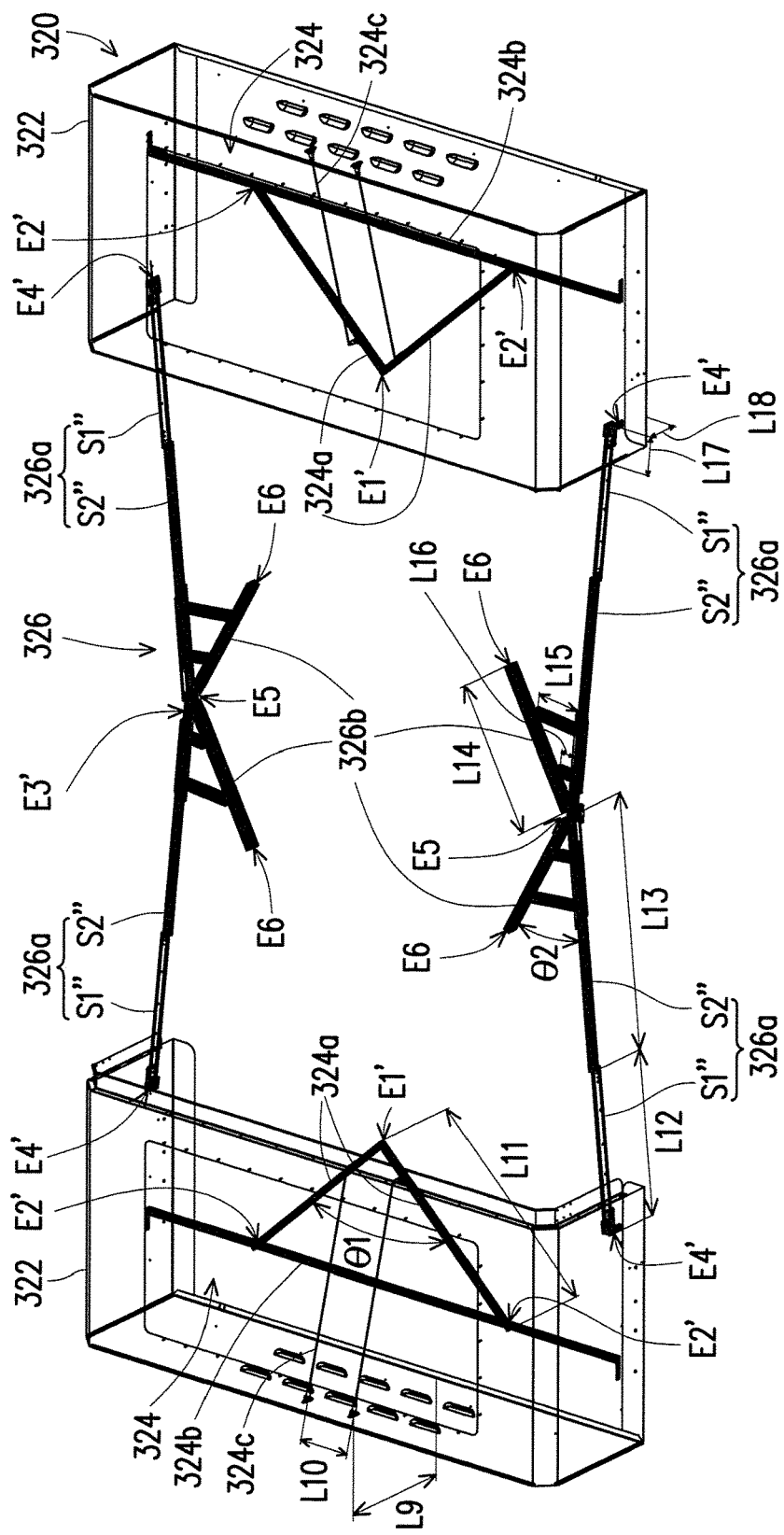
FIG. 8 illustrates the covers in FIG. 7 being expanded.

FIG. 7 is a perspective view of a covering mechanism according to another embodiment of the invention. FIG. 8 illustrates the covers in FIG. 7 being expanded. In the covering mechanism 320 in FIG. 7 and FIG. 8, arrangement and operation of covers 322, first position-limiting components 324, first rods 324a, first ends E1', second ends E2', connecting elements 324b, second position-limiting components 326, second rods 326a, third ends E3', fourth ends E4', first segment S1" and second segment S2" are similar to arrangement and operation of the charge device 100 of FIG. 1A to FIG. 3. Accordingly, when the covering mechanism 320 is in the closed state shown in FIG. 7, the first position-limiting components 324 and the second position-limiting components 326 are not crossed when the first position-limiting components 324 and the second position-limiting components 326 have the same height. Hence, even if the first position-limiting components 324 and the second position-limiting components 326 are aligned to each other along the moving axis of the covers 322, the first position-limiting components 324 and the second position-limiting components 326 would not be interfered with each other, and the covering mechanism 320 is able to be operated successfully.

Further, each of the second position-limiting components 326 includes two extending rods 326b disposed on the second rods 326a respectively, and an extending direction of each of the extending rods 326b is not parallel to an extending direction of the corresponding second rod 326a. By the extending rods 326b, the second position-limiting components 326 are adapted to position the drone properly. Specifically, each of the extending rods 326b has a fixed end E5 and a free end E6 opposite to the fixed end E5, and the fixed ends E5 are connected to the second rods 326a respectively and adjacent to each other. When the covers 322 are in the closed state, the two extending rods 326b of each of the second position-limiting components 326 of the embodiment form a ">" shaped structure. By this arrangement, the second position-limiting components 326 could smoothly guide the drone to move to the predetermined position by the extending rods 326b contacting the stands 52 of the drone 50.

In the embodiment, each of the first position-limiting components 324 further includes a plurality of ropes 324c (two ropes 324c are illustrated). Each of the ropes 324c is connected between the corresponding first rod 324a and the corresponding cover 322, for enhancing structural strength of the covering mechanism 320. The plurality of ropes 324c uses against the gravity of the first rods 324a.

As an example, the sizes of the covering mechanism 320 are described below. Referring to FIG. 8, in the embodiment, a distance L9 between the rope 324c and a bottom side of the cover 322 is about 293 mm, a distance L10 between the two ropes 324c is about 116 mm, a length L11 of each of the first rods 324a is about 643 mm, a length L12 of the first segment S1" is about 492 mm, a length L13 of the second segment S2" is about 743 mm, a length L14 of each of the extending rods 326b is about 443 mm, a length L15 of an enhanced rod connected between the extending rod 326b and the second rod 326a is about 200 mm, a length L16 of another enhanced rod connected between the extending rod 326b and the second rod 326a is about 104 mm, a distance L17 between the fourth end E4' and a front side of the cover 322 is about 106 mm, a distance L18 between the fourth end E4' and a bottom side of the cover 322 is about 131 mm, an included angle θ1 between the two first rods 324a is about 92 degrees, and an included angle θ2 between the extending rod 326b and the second rod 326a is about 33 degrees.

Figure 9:
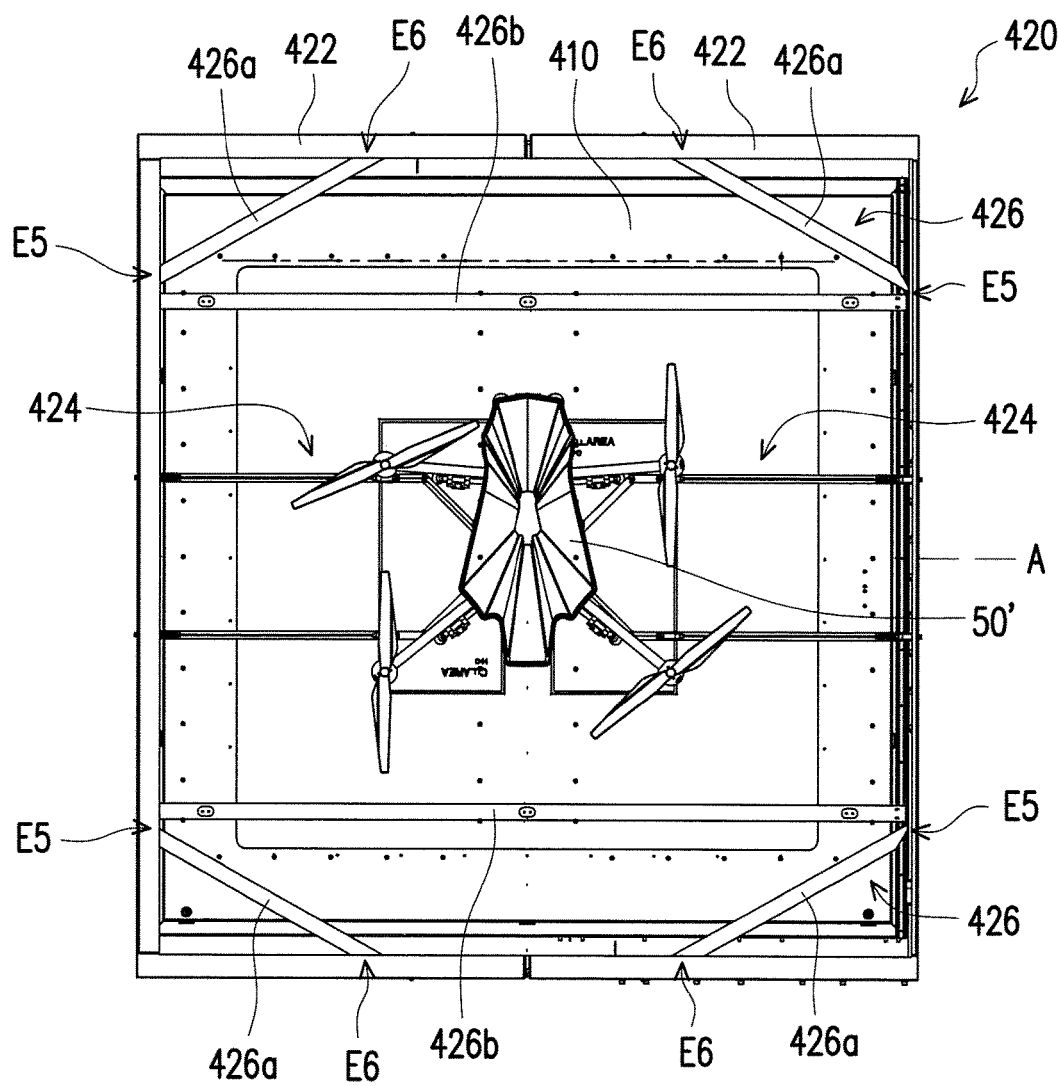
FIG. 9 is a top view of partial structure of a charge device with a drone according to another embodiment of the invention.
Figure 10:
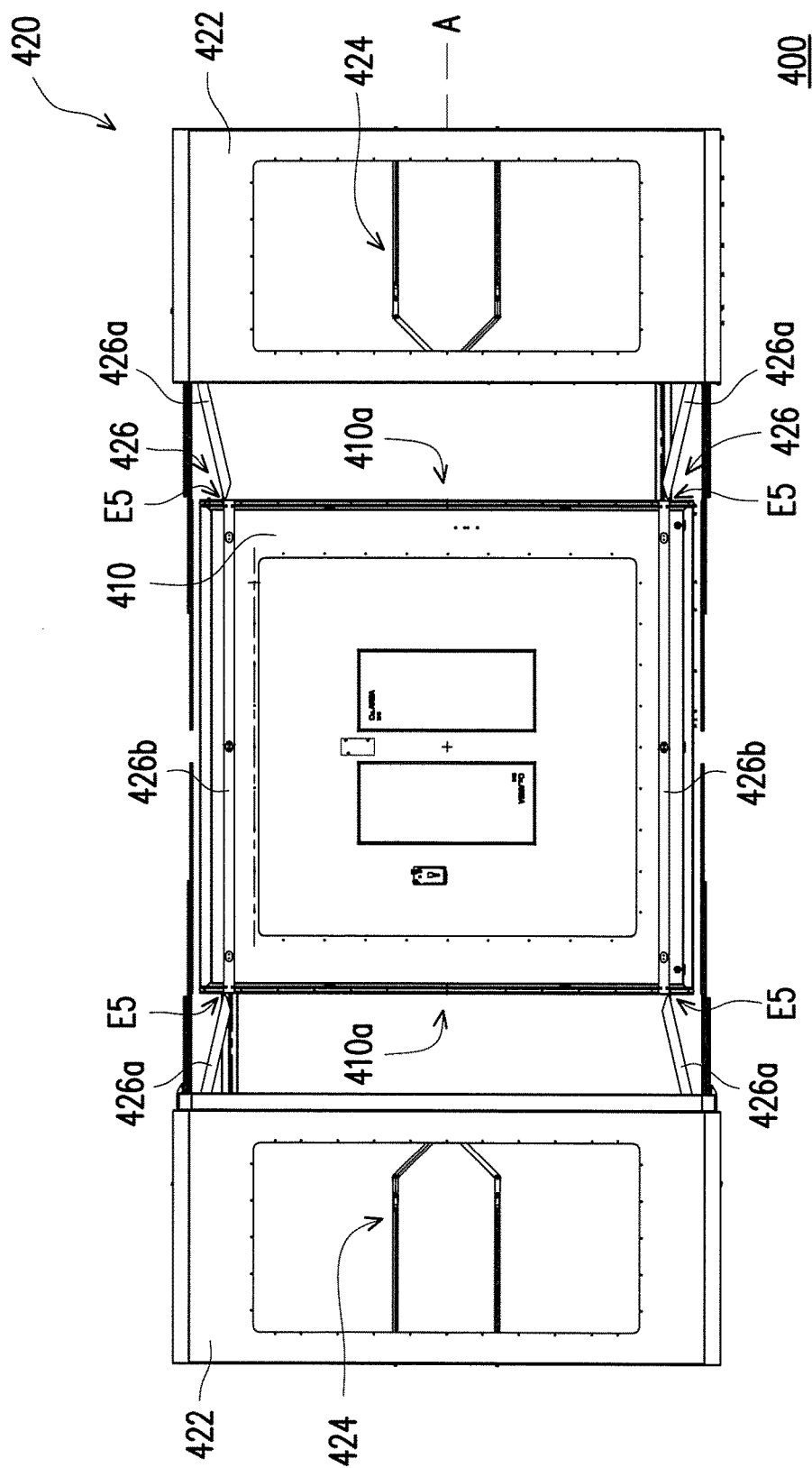
FIG. 10 illustrates the covers of FIG. 9 moving away from each other.
Figure 11:
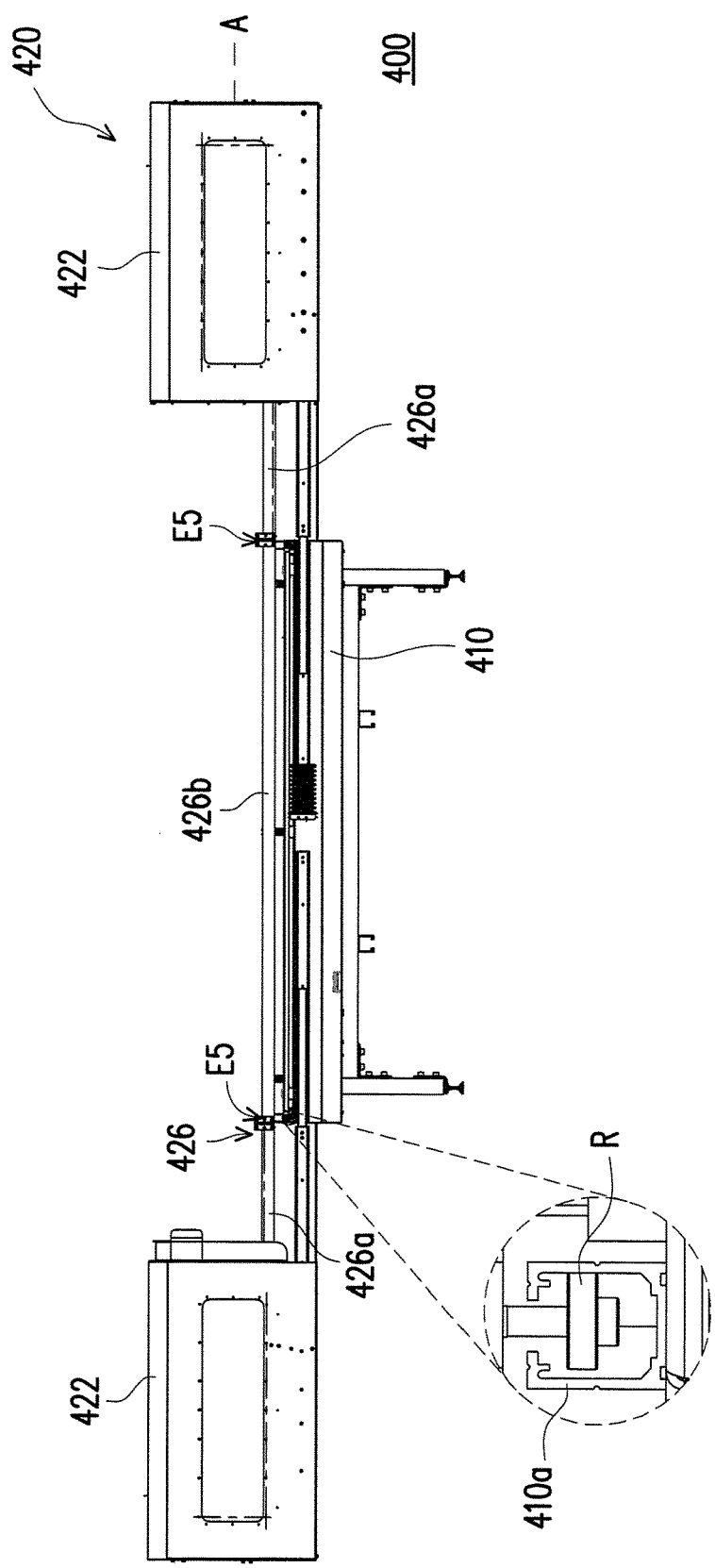
FIG. 11 is a side view of the charge device in FIG. 10.

FIG. 9 is a top view of partial structure of a charge device with a drone according to another embodiment of the invention. FIG. 10 illustrates the covers in FIG. 9 moving away from each other. FIG. 11 is a side view of the charge device in FIG. 10. In the charge device 400 of FIG. 9, FIG. 10 and FIG. 11, arrangement and operation of a drone 50', a base 410, a covering mechanism 420, covers 422, first position-limiting components 424 and second position-limiting components 426 are similar to arrangement and operation of the drone 50, the base 110, the covering mechanism 120, the covers 122, the first position-limiting components 124 and the second position-limiting components 126 in FIG. 1A to FIG. 4. The difference between the charge device 400 and the charge device 100 is that, each of the second position-limiting components 426 comprises two third rods 426a and a fourth rod 426b, each of the third rods 426a has a fifth end E5 and a sixth end E6 opposite to the fifth end E5, the fifth ends E5 are pivoted to two opposite ends of the fourth rod 426b respectively, and the sixth ends E6 are pivoted to the covers 422 respectively. When the covers move like the states of FIG. 9 and FIG. 10, the fourth rod 426b correspondingly moves toward or away from the drone 50', so as to position or release the drone 50'.

Specifically, the base 410 has two sliding rails 410a in FIG. 10, the two opposite ends of the fourth rod 426b are slidably disposed at the two sliding rails 410a respectively. For example, each of the ends of the fourth rod 426b has a roller R (illustrated in FIG. 11). The fourth rod 426b is slidably disposed at the corresponding sliding rails 410a through the roller R. In addition, an extending direction of each of the two sliding rails 410a is perpendicular to the moving axis A of the covers 422. By doing this, the two opposite ends of the fourth rod 426b are adapted to move simultaneously along the two sliding rails 410a parallel to each other.

In summary, the embodiments of the invention have at least one of the following advantages or effects. In the charge device of the invention, the first position-limiting components and the second position-limiting components are connected to the covers, such that when the covers are moved between the expanded state and the closed state, the first position-limiting components and the second position-limiting components are driven by the covers to position or release the drone. Accordingly, only one driving unit has to be installed at the charge device for driving the covers, and for driving the first position-limiting components and the second positioning-limiting components through the covers, so as to save the manufacturing cost. In addition, the first position-limiting components and the second position-limiting components are adapted to move far away from the charge portion along with the covers. That is, a large operation space is provided for the first position-limiting components and the second position-limiting components by the moving range of the covers, such that the first position-limiting components and the second position-limiting components are able to position the drone properly.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations may be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Moreover, "first", "second", "third", "fourth" etc. mentioned in the specification and the claims are merely used to name the elements and should not be regarded as limiting the upper or lower bound of the number of the components/devices.

What is claimed is:

1. A charge device for a drone, comprising:
 a base, having a charge portion; and
 a covering mechanism, comprising:
  two covers, movably disposed on the base, wherein the covers are adapted to move toward each other to become a closed state and cover the charge portion, and the covers are adapted to move away from each other to become an expanded state and expose the charge portion;
  two first position-limiting components, connected to the covers respectively; and
  two second position-limiting components, each of the second position-limiting components is connected between the covers.

2. The charge device according to claim 1, wherein when the covers are in the closed state, the first position-limiting components and the second position-limiting components are located above the charge portion, and when the covers are in the expanded state, the first position-limiting components and the second position-limiting components are away from the charge portion.

3. The charge device according to claim 2, wherein when the covers are in the expanded state, the drone is adapted to land on the charge portion or takeoff from the charge portion, and when the covers move from the expanded state to the closed state, the first position-limiting components and the second position-limiting components push the drone located on the charge portion to move to a predetermined position.

4. The charge device according to claim 3, wherein the drone has a plurality of stands for contacting the charge portion, and when the covers move from the expanded state to the closed state, each of the stands is pushed by one of the first position-limiting components and one of the second position-limiting components.

5. The charge device according to claim 3, wherein when the covers are in the closed state, a containing space is formed between the covers and the base and adapted to contain the drone.

6. The charge device according to claim 5, wherein each of the covers has an upper wall and a plurality side walls connected to the top wall, and when the covers are in the closed state, the upper walls are aligned to the charge portion and the side walls surround the charge portion to form the containing space.

7. The charge device according to claim 3, wherein the charge portion has a supporting surface adapted to support the drone, and the covers are slidably disposed on the base along a moving axis parallel to the supporting surface.

8. The charge device according to claim 1, wherein each of the first position-limiting components and each of the second position-limiting components are misaligned with each other along a moving axis of the covers.

9. The charge device according to claim 1, wherein the first position-limiting components are fixed at the covers respectively.

10. The charge device according to claim 1, wherein each of the first position-limiting components comprises two first rods, each of the first rods has a first end and a second end opposite to the first end, the first ends are connected to each other, and the second ends are extended toward the corresponding cover.

11. The charge device according to claim 10, wherein each of the first position-limiting components further comprises at least one connecting element, and the at least one connecting element is connected between at least one of the first rods and the corresponding cover.

12. The charge device according to claim 1, wherein each of the second position-limiting components is pivoted between the covers.

13. The charge device according to claim 1, wherein each of the second position-limiting components comprises two second rods, each of the second rods has a third end and a fourth end opposite to the third end, the third ends are pivoted to each other, and the fourth ends are pivoted to the covers respectively.

14. The charge device according to claim 13, wherein each of the second rods comprises a first segment and a second segment slidably disposed on each other, the first segments are pivoted to the covers respectively, and the second segments are pivoted to each other.

15. The charge device according to claim 13, wherein when the covers are in the closed state, a distance between the two second position-limiting components is increased gradually from each of the third ends to the corresponding fourth end.

16. The charge device according to claim 13, wherein the fourth ends are located between the two first position-limiting components.

17. The charge device according to claim 13, wherein each of the second position-limiting components further comprises two extending rods disposed on the second rods respectively, and an extending direction of each of the extending rods is not parallel to an extending direction of the corresponding second rod.

18. The charge device according to claim 1, wherein each of the second position-limiting components comprises two third rods and a fourth rod, each of the third rods has a fifth end and a sixth end opposite to the fifth end, the fifth ends are pivoted to two opposite ends of the fourth rod respectively, and the sixth ends are pivoted to the covers respectively.

19. The charge device according to claim 18, wherein the base has two sliding rails, the two opposite ends of the fourth rod are slidably disposed at the two sliding rails respectively.

20. The charge device according to claim 19, wherein an extending direction of each of the two sliding rails is perpendicular to a moving axis of the covers.

* * * * *